Feb. 5, 1952 J. W. McNAIRY 2,584,725
TOASTER TIMING MECHANISM
Filed March 12, 1947 2 SHEETS—SHEET 1

Inventor:
Jacob W. McNairy,
by Alfred V. Bobst
His Attorney.

Feb. 5, 1952 — J. W. McNAIRY — 2,584,725
TOASTER TIMING MECHANISM
Filed March 12, 1947 — 2 SHEETS—SHEET 2

Inventor:
Jacob W. McNairy,
by Alfred E. Bobst
His Attorney.

Patented Feb. 5, 1952

2,584,725

UNITED STATES PATENT OFFICE 2,584,725

TOASTER TIMING MECHANISM

Jacob W. McNairy, Westport, Conn., assignor to General Electric Company, a corporation of New York Application March 12, 1947, Serial No. 734,091

2 Claims. (Cl. 219—19)

1

This invention relates to electric cookers, more particularly to such cookers which cook in successive heating operations, such as bread toasters, and more particularly to such devices having a thermally responsive timing device which measures the cooking period, and it has for its object the provision of an improved device of this character.

More specifically, this invention contemplates an improved cooker having improved means for compensating for the stored heat of the cooker whereby successive cooking operations are uniform; for example, in a bread toaster successive bread slices are toasted to substantially the same color. It will be understood that with the first slice of bread toasted in a toaster at room temperature a considerably longer period of time is required to toast it to a given color than in the case of succeeding slices, because on the first toasting operation a large percentage of the heat generated goes into the mass of the toaster, whereas, on succeeding operations the toaster mass is already heated and most of the generated heat goes into the toasting of the slices. It is an object of this invention to provide a longer first cooking period and to measure successive cooking periods so that all the slices are browned uniformly, and in particular to do so in a toaster having a thermal timer wherein a thermal element is heated by auxiliary heater means, separate from the main toaster heater, in such a way as to control the toasting time. And it does so by constructing and arranging such auxiliary heating means to control and vary the amount of heat supplied to the thermal timing element in order to time the various toasting periods to produce uniformly toasted slices.

Figure 1:
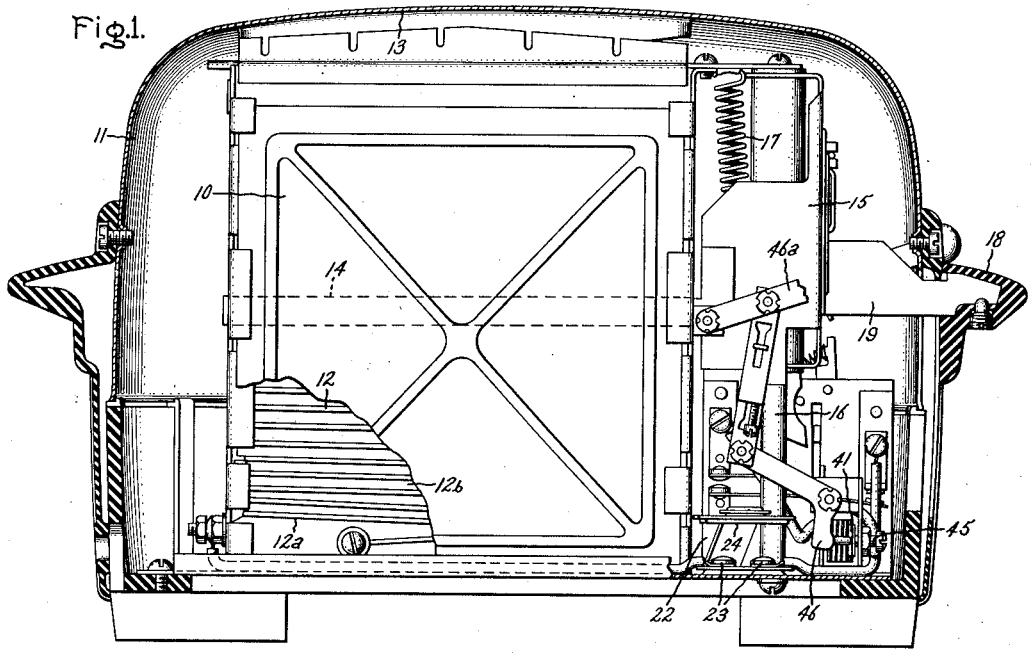
Figure 2:
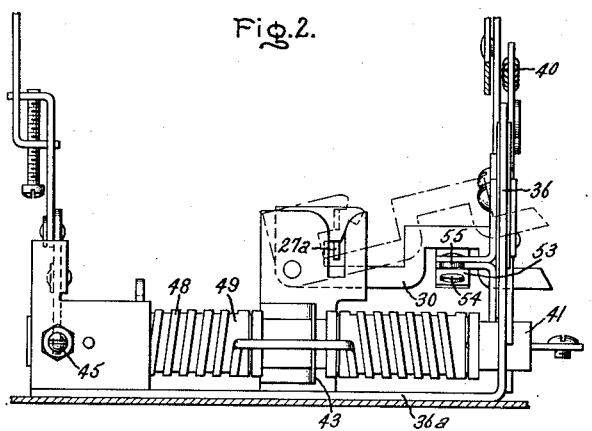
Figure 3:
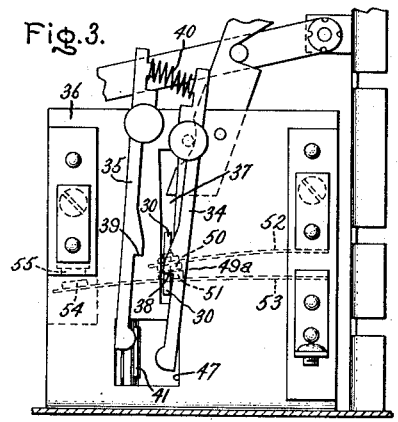
Figure 6:
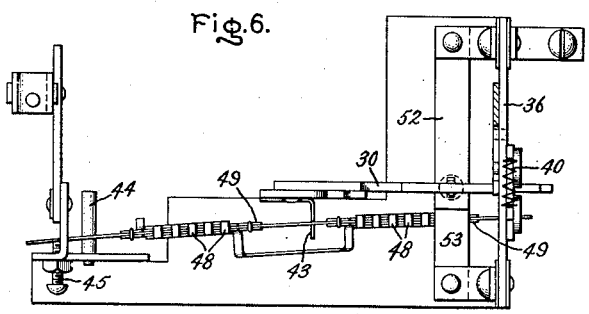
Figure 4:
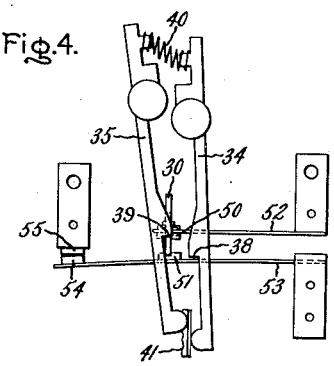
Figure 5:
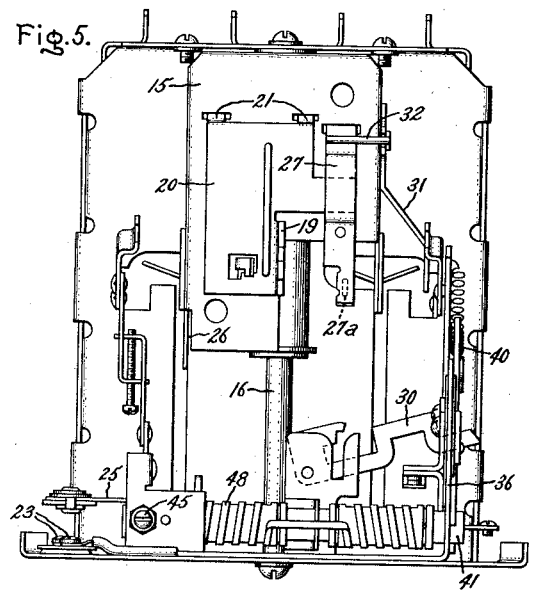
Figure 7:
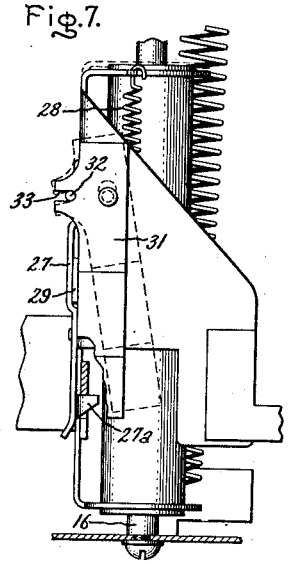
Figure 8:
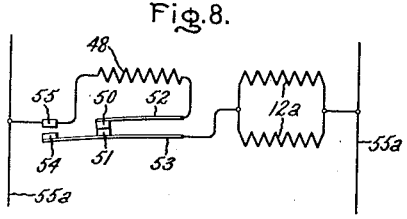

For a more complete understanding of this invention, reference should be had to the accompanying drawings in which Fig. 1 is a vertical sectional view taken through an electric toaster embodying this invention; Fig. 2 is a front elevation of a thermally operable timing mechanism used in controlling the toaster of Fig. 1; Fig. 3 is a side elevation of the timing mechanism of Fig. 2; Fig. 4 is a fragmentary view similar to Fig. 3 but illustrating certain elements in different operative positions; Fig. 5 is a front elevation of the toaster shown in Fig. 1, the outer casing being removed so as to illustrate certain structural details; Fig. 6 is a plan view of the thermal timing mechanism shown in Fig. 2; Fig. 7 is a side elevation of certain of the elements of Fig. 5, this figure being drawn to a larger scale than is Fig. 5; Fig. 8 is a diagrammatic represen-

Figure 10:
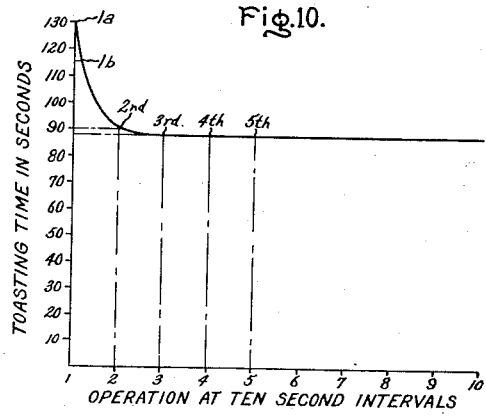
Figure 9:
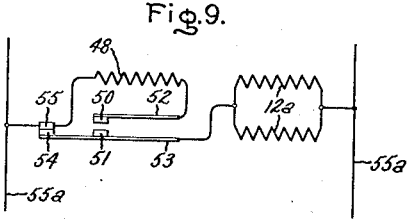
Figure 11:
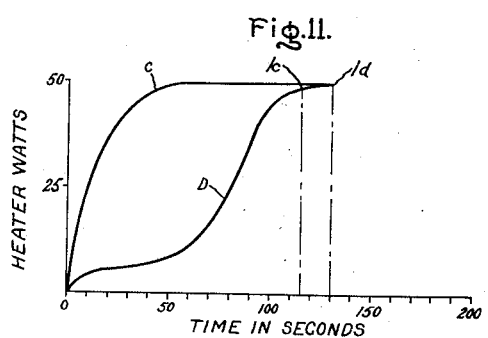

2 tation of the heating elements of the toaster, auxiliary heating means for the thermal timer mechanism, and certain of the control elements therefor; Fig. 9 is a view similar to Fig. 8 but illustrating certain elements in different operative positions; and Figs. 10 and 11 are diagrammatic views to assist in understanding the operation of this invention.

Referring to the drawings, this invention has been shown in one form as applied to an electric bread toaster provided with a thermal timing mechanism of the "heat-up" and "cool-down" type wherein each toasting period is measured by the summation of the time interval required to heat a thermal time element up to a certain high temperature and the time interval consumed in allowing it to cool down; and as applied to the toaster described and claimed in U. S. Patent to H. L. Newell 2,367,044, January 9, 1945. It is to be understood, however, that this invention is applicable generally to cookers having thermal timing elements which are provided with their own heating means. As described in the Newell patent, and as shown in the drawings, this toaster comprises a heating chamber 10 housed in an outer casing 11. The heating chamber is heated by a pair of heating elements 12 on the sides spaced apart so that a slice of bread (not shown) may be inserted between them in order to be toasted. The heating element 12 has resistance ribbon-like conductors 12a supported on vertically positioned electrically insulated sheets 12b. The bread slice is introduced into the heating chamber through a slot (not shown) in the top wall 13 of the outer casing, which slot is in registry with the space between the two heating elements. A slice support, or carrier 14 is mounted in the chamber between the two heating elements, and its forward end is attached to a supporting carriage 15 which is located in the forward part of the casing 11 in front of the heating chamber 10. This carriage is mounted for vertical movement on a vertical rod 16 fixed in the casing, and it is biased upwardly to bias the slice carrier up to a non-toasting position (shown in Figs. 1 and 5) by means of a tension spring 17. A main control knob 18, located outside of the front wall of the casing 11, is connected to the carriage 15 by a tongue 19 so that when the knob is depressed it moves the carriage and bread carrier downwardly to their toasting positions. The tongue 19 is mounted on a plate-like bracket 20 which is connected to carriage 15 by a hinge means 21 whereby it may be displaced outwardly from the carriage at the bottom.

The carriage 15 also functions to control a main switch 22 connected in the circuit of the toaster resistance elements 12a (Fig. 8) which switch comprises a pair of spaced apart stationary contacts 23 and a coacting bridge contact 24 mounted on and insulated from a spring arm 25. This arm normally holds the contacts open, but is depressed to cause contact 24 to bridge contacts 23 when the carriage 15 is lowered by the engagement of the carriage arm 26 (Fig. 5) with the switch arm. When the carriage rises, the spring arm 25 opens the switch.

The carriage 15 is held downwardly in its toasting position by a latching mechanism comprising a hold-down latch 27 (Fig. 5) pivoted at its upper end to the carriage and, as fully described in the Newell patent, is mounted so that it may move for a limited distance vertically with reference to the carriage; and it is biased upwardly by a tension spring 28. The bracket 20 is provided with an extension 29 to release the latch, as later described.

Projecting inwardly from the lower end of the latch 27 is a locking projection 27a (Figs. 2 and 5) which is engaged by a pivoted latch arm 30, as shown in Fig. 2, so as to be held down by the arm. The latch arm is moved clockwise from the dotted line position of Fig. 2 to the latching solid line position thereof by the carriage 15 when it is lowered to toasting position. For this purpose, the carriage carries a loading arm 31 (Figs. 5 and 7) for engaging and depressing the latch arm as the carriage is lowered. The loading arm is pivotally mounted at its upper end to the carriage to engage the latch arm when the carriage is depressed, to move the latch arm to its full line position of Fig. 2, and then the projection 27a on arm 27 engages the latch arm, pivots the hold-down arm 27 away from the carriage and finally falls in below the latch to secure the carriage in its lower position.

Secured to the upper end of the hold-down latch 27 is a pin 32 (Figs. 5 and 7) which is received in a slot 33 provided for it in the loading arm 31. By reason of this connection, after the carriage has been lowered by knob 18 so that the projection 27a is engaged by the latch arm 30, and the knob 18 released the carriage 15 will be moved upwardly slightly by the spring 17, the extent of the movement being equal to the movement permitted between the hold-down latch 27 and the carriage. This movement will be sufficient to rotate the loading arm 31 to its dotted line position of Fig. 7 thereby to remove it from its position over the latch arm 30.

The latch arm 30 is secured in its full line locking position of Fig. 2 by means of a pair of pivoted trip-out latches 34 and 35 (Figs. 3 and 4). These latches are pivoted to an upright plate 36 on opposite sides of an elongated slot 37 in the plate through which the end of the latch arm 30 projects. Plate 36 is mounted on base 36a. Intermediate their ends the trip-out latches 34 and 35 are provided with hooks 38 and 39, the hook 39 being elevated with respect to the hook 38 as shown. The lower ends of the latches 34 and 35 are biased together by compression spring 40.

The latches 34 and 35 are controlled by an elongated temperature responsive strip or bar-like element 41 of the bi-metallic type. This element is mounted above the base 36a in edgewise relation in a suitable bracket 43 which has a slot in which the element is loosely received. The left hand end of the bi-metallic element, as viewed in Fig. 6, is supported by means of a pin 44 received in an enlarged aperture provided for it in the element. Movement of this end of the bi-metallic element is limited by means of an adjustable abutment 45 on one side and an abutment 46 on the other, the position of which is controlled by a lever 46a (Fig. 1) which in turn is controlled by a knob (not shown) in the front of the exterior of the toaster.

The right-hand end of the bi-metallic element 41, as viewed in Fig. 2, is projected through an opening 47 formed in the plate 36 and is received between the lower ends of the trip-out latches 34 and 35. The element is intended to be heated to a predetermined high temperature and then cooled down, all in order to measure the toasting period; and when it is heated up to the predetermined high temperature it moves the two latches counterclockwise from their position of Fig. 3 to their position of Fig. 4 and thereby cause the arm 34 to release latch arm 30 and to be engaged by latch arm 35, as shown in Fig. 4, and when it cools down subsequent to this operation, it shifts latch arm 35 clockwise to release the latch arm 30 and thereby release the toast carriage 15 and the bread slice carrier.

For the purpose of controlling the heating of the bi-metallic element 41 there is provided an auxiliary heating element 48 in the form of a resistance ribbon-like conductor wrapped around the element, as shown, and insulated from it electrically by suitable insulating sheets 49, formed of mica or some other suitable insulating material.

The energization of the heating element 48 is controlled by means of a control switch 48a, comprising a pair of contacts 50 and 51, the former mounted on a spring arm 52 and the latter on a spring arm 53, both of which are supported on the panel 36. The switch arm 53 is longer than the arm 52 and extends beyond the contacts 50 and 51 and on its extended end it carries a contact 54 which coacts with a fixed contact 55 on panel 36. The two switch arms 52 and 53 and the contact 55 are electrically insulated from this panel, and they are electrically connected in the circuits of the toast heating element 12a and of the auxiliary heating element 48, as shown in Figs. 8 and 9. The two spring arms 52 and 53 are biased upwardly so as to open contacts 50 and 51 and close contacts 54 and 55. The arms, however, are depressed when the carriage 15 is lowered to its toasting position by means of latch arm 30 as it is moved to its full line latching position of Fig. 2. This operation closes contacts 50 and 51 and opens contacts 54 and 55, and thereby, as shown in Fig. 8, connects the heater 48 in series with the toast heating elements 12a and with the electric supply source conductors denoted by the numeral 55a. As the toaster heats up to toast a slice, the auxiliary heater 48 heats the bi-metallic element 41 and causes its outer end to move to the right, as viewed in Figs. 3 and 4, to move the latches 34 and 35 counterclockwise, first to cause the latch 34 to release the latch arm 30 and then to cause its engagement with latch arm 35, as previously described. This operation permits the latch arm 30 to rise somewhat and this operation permits the switch arms 52 and 53 to rise, first to cause contact 54 to engage contact 55 and then to cause contact 50 to leave contact 51. This deenergizes the auxiliary heater 48, as shown in Fig. 9, but permits continued energization of the main toaster heaters 12a. The bi-metallic element 41 then cools and returns toward its initial position of Fig. 3, and as it does so it pivots latch 35 clockwise to release the latch arm 30 and thereby permit spring 17 to move carriage 15 and the slice holder 14 to their non-toasting positions; this movement of the carriage releases carriage arm 26 (Fig. 5) from the main switch arm 25, whereby the main heating elements 12a are de-energized.

The toaster knob 18 may then be depressed in order to effect a subsequent toasting operation.

At any time during a toasting cycle the toast carrier 15 may be elevated for inspection of the slice being toasted by elevating the knob 18. This pivots bracket 20 to remove the latch projection 27a from the latch arm 30. After inspection, the carriage may be depressed and locked and the toasting resumed.

In accordance with this invention, the heater 48 is formed of a material which has a relatively high positive temperature coefficient of resistance compared to conventional nickel-chromium alloy heating elements. For example, pure nickel, or an alloy of nickel and iron wherein the proportion of nickel is greatly preponderant, is suitable. Such materials have a temperature coefficient of resistivity in the neighborhood of 0.006 per degree centigrade as compared to 0.00015 to 0.0002 for nickel-chromium alloys conventionally used as heating elements. That is, the resistance of the heater 48 increases rapidly with temperature rise so that the watts input to the bi-metallic element 41 increases rapidly with the temperature rise, in contra-distinction with the prior heaters, all of which function to deliver a substantially constant wattage to the thermal timing element, irrespective of temperature variations. The heater 48 is arranged with the positive temperature coefficient of resistance in order to measure such toasting intervals that the first and succeeding slices of bread will be toasted uniformly; more specifically, to increase materially the time period of the first slice as compared with the second and the succeeding. With the specific toaster illustrated the first time period is about 130 seconds, the second about 90, the third is about 88, and the remaining substantially 88. That is, on the first cycle, when the toaster is at room temperature, the resistance of the auxiliary heater 48 is relatively low and therefore it requires a considerable period of time for the heater to generate sufficient watts to heat the thermal element 41 to the high temperature at which the trip latch 34 is operated to de-energize the auxiliary heater; this, of course, lengthens the first cycle. On the second toasting cycle, when the mass of the toaster has been heated up somewhat and where the auxiliary heater and associated thermal element 41 have some stored heat in them, the resistance in the auxiliary heater on this cycle will be higher, and therefore, it will require less time for this heater to generate the wattage required to heat the thermal element 41 to the temperature where it trips latch 34 to cut itself out. The second toasting period, therefore, will be shorter, and so will the third and succeeding cycles, provided of course, they occur in fairly rapid succession. Generally the third and succeeding cycles will have substantially the same toasting period because now the toaster mass will be heated up to its saturation temperature.

In connection with the construction it will be noted that there is utilized a bimetallic thermostatic timer of the so termed heat-up cool-down type and that the total cooking period for any one operation is the heat-up period plus the cool-down period; and that in accordance with the invention the heat-up period is varied. With this arrangement the length of successive total cooking periods i. e. the heat-up period plus the cool-down period is varied by the use of a single auxiliary heater which acts directly on the bimetallic element.

It will be understood that the thermal mass of the bimetal element 41 and its heater resistance 48 will be such that the temperature of resistances 48 at the start of any cycle is such that that cycle will have the proper working period.

I have found that with the specific toaster illustrated an auxiliary heater is satisfactory which has a resistance of 0.1 ohm at room temperature and which increases the resistance to a value of 0.4 ohm for the maximum degrees of brownness setting of lever 46a. At the same time, it may be noted that the main or primary toaster heating element 12a presents a resistance in the series circuit of from 12 to 14 ohms. Thus, it may be seen that the change in resistance of the secondary heater 48 does not materially affect the total line current flowing.

The problem, and applicant's solution of it is illustrated graphically in Figs. 10 and 11. In Fig. 10 there is plotted a curve with "operations at ten second intervals" (meaning there are ten seconds between succeeding cycles) as abscissa and "toasting time in seconds" as ordinate.

The curve is an ideal curve for the toaster shown. Heretofore, when the auxiliary timer heater generates a substantially constant wattage, if the wattage is such that the second, third and succeeding toasting operations had the desired toasting interval to produce a given color of toast, the first would be too short; instead of having the desired 130 second time period, indicated at point 1a, it would have some shorter value, say, 115 seconds, as shown at point 1b. This, of course, would cause the first slice to be too light. This result obtained by use of a substantially constant wattage heater is demonstrated by curve C, shown in Fig. 11, wherein "heater watts" is plotted as ordinate against "time" as abscissa; here it will be observed that the watts input during the first cycle, which terminates at point 1c, increases quite rapidly with time, and, hence, cuts down the duration of the first cycle.

On the other hand, with the constant wattage input heater, if the watts input is reduced so as to lengthen the period of the first cycle to 130 seconds in order to obtain the desired color, then the remaining cycles would be timed too fast and the toast of these cycles would be too light.

With the heater arranged in accordance with the applicant's invention, the watts generated against time follows the curve D in Fig. 11. Here it will be observed that initially the watts increase with time is considerably less per unit of time than in the case of curve C, and as a result the time period of the first cycle is materially increased to point 1d. And this is done without decreasing the time periods of the second and succeeding cycles below the desired value. Hence, the slices are uniformly toasted.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a periodically operated cooking device having a primary electric heater for heating said device and a timing mechanism for establishing periods of cooking action of said primary heater, said mechanism comprising an elongated bimetallic thermostat bar constituting a timing element, secondary electric resistance heating means for heating said element to a predetermined high temperature, control means for said primary heater and for said secondary heating means controlled by said element to interrupt the action of said secondary heating means when said element attains said predetermined high temperature and to interrupt the action of said primary heater only when said element has cooled to a relatively low temperature, and said secondary heating means being formed into a ribbon mounted on and wrapped around said bar from end to end, and further being formed from predominantly nickel and iron to provide a high positive temperature coefficient of resistance to shorten the second and subsequent cooking periods in proportion to the heat stored in said cooking device so as to cook edibles in succession to substantially the same degree.

2. In an automatic electric toaster including a primary electric heater for heating said toaster, a timing mechanism of the heat-up cool-down type wherein the total cooking period is the heat-up period plus the cool-down period for determining the duration of cooking action by said primary heater, said mechanism comprising a bimetallic thermostat bar constituting a timing element, a secondary electric resistance heater in immediate proximity to said thermostatic element and being formed predominantly of nickel and iron to provide a high positive temperature coefficient of resistance, said secondary heater being initially connected in series circuit relation with the primary heater and having a relatively low resistance with respect thereto whereby the resistance of the primary heater predominantly determines the current flowing in said series circuit, control means for the primary heater and for said secondary heater operated by said element to interrupt the action of said secondary heater when said element attains a predetermined high temperature and to interrupt the action of the primary heater only when said element has cooled to a relatively low temperature, the heating effect of said secondary heater on said thermostatic element serving to shorten the heat-up period and hence the toasting time by an amount dependent upon the temperature of said secondary heater and the heat stored in said toaster to thereby shorten the second and subsequent cooking periods to toast edibles in succession to the same degree.

JACOB W. McNAIRY.

REFERENCES CITED

The following references are of record in the file of this patent:

UNITED STATES PATENTS

| Number | Name | Date |
| --- | --- | --- |
| 2,135,270 | Ashton et al. | Nov. 1, 1938 |
| 2,179,811 | Brosseau | Nov. 14, 1939 |
| 2,250,979 | Winborne | July 29, 1941 |
| 2,325,551 | Scharf | July 27, 1943 |
| 2,356,649 | Bucher | Aug. 22, 1944 |
| 2,367,044 | Newell | Jan. 9, 1945 |
| 2,414,396 | Sardeson | Jan. 14, 1947 |

OTHER REFERENCES

"Standard Handbook for Electrical Engineers"; sixth edition, McGraw-Hill Book Co., Inc., New York.